United States Patent [19]

Muller

[11] 3,930,143

[45] Dec. 30, 1975

[54] CIRCUIT FOR MEASURING THE RATE OF SYNCHRO ROTATION

[75] Inventor: Hans Rudolf Muller, Kirkland, Wash.

[73] Assignee: Sundstrand Data Control, Inc., Redmond, Wash.

[22] Filed: May 27, 1975

[21] Appl. No.: 581,394

[52] U.S. Cl. ............. 235/150.2; 235/186; 340/198; 318/175; 73/179
[51] Int. Cl.² ................... G06G 7/78; G06G 7/22
[58] Field of Search .... 340/198; 235/150.2, 150.27, 235/150.271, 186, 189; 73/179; 318/175; 328/133

[56] References Cited
UNITED STATES PATENTS

| | | | |
|---|---|---|---|
| 3,206,975 | 9/1965 | Elwell et al. | 73/179 |
| 3,434,132 | 3/1969 | Smith et al. | 340/198 |
| 3,496,565 | 2/1970 | Jenkens | 235/186 X |
| 3,582,626 | 6/1971 | Stansbury | 235/150.2 |
| 3,685,034 | 8/1972 | Hedrick | 340/198 |
| 3,737,639 | 6/1973 | Fletcher et al. | 235/186 |
| 3,843,877 | 10/1974 | Roselle et al. | 235/150.27 |
| 3,889,104 | 6/1975 | Smith | 235/150.2 |

*Primary Examiner*—John S. Heyman
*Attorney, Agent, or Firm*—Ted E. Killingsworth; Michael B. McMurry

[57] ABSTRACT

Utilizing a three-wire input from a synchro, a signal representing the rate of rotation of the synchro shaft is generated by means of: summing amplifiers to generate signals representing the cosine of the shaft angle and the sine of the shaft angle; a circuit for generating a signal representing the tangent of the shaft angle; a circuit for generating the signal representing the cotangent of the shaft angle; feedback circuits for linearizing both the tangent and cotangent signals; a differentiator circuit for differentiating the tangent signal; a differentiator circuit for differentiating the cotangent signal; and a switching circuit for selecting the rate output from the differentiator with a linear output.

15 Claims, 4 Drawing Figures

3,930,143

CIRCUIT FOR MEASURING THE RATE OF SYNCHRO ROTATION

BACKGROUND OF THE INVENTION

The invention relates to the field of synchro systems and more particularly to circuits that generate signals representative of the rate of rotation of the synchro's shaft.

An example of the necessity for using the rate of rotation of the synchro shaft occurs in aircraft ground proximity warning systems where there is a requirement for measuring the rate of change in barometric altitude. In many aircraft the only source of such signals in a synchro that represents the aircraft's barometric altitude by means of a particular shaft angle. Typically the synchro output represents altitude with a scale factor of 5,000 feet or 18,000 feet of altitude per revolution of the synchro shaft. Normally, the rate of change in barometric altitude can be achieved by simply differentiating the output of the synchro. However, in the prior art circuits for performing this differentiation or rate conversion, a number of problems arose, including providing for a continuous output of the rate converter circuit; the sensitivity of the converter circuit to the synchro excitation voltage or frequency variations; the sensitivity of the conversion circuit to harmonic distortion and phase shift of the synchro excitation voltage; and the dilatorious effect of noise and spurious signals on the synchro signal lines. An additional problem with the prior art systems was to provide a simple means of detecting a failure in the rate circuitry itself or a failure in one or more of the synchro input signals.

SUMMARY OF THE INVENTION

It is therefore an object of the invention to provide a rate circuit that utilizes a three phase input from a synchro to generate a signal representing the cosine of the shaft angle and a signal representing the sine of the shaft angle that are further combined to generate signals representing the tangent and cotangent of the shaft angle which in turn are each differentiated into a signal representing the rate of shaft rotation where the appropriate rate signal is selected by a switch circuit.

It is an additional object of the invention to provide a synchro rate circuit that utilizes summing amplifiers to convert three phase output of the synchro into signals representing the cosine and sine of the shaft angle; a first circuit which converts the sine and cosine signals into a tangent signal; a feedback circuit for linearizing the tangent signal; a first differentiator circuit for differentiating the linearized tangent signal; a second circuit for converting the cosine and sine signal into a cotangent signal; a second feedback circuit for linearizing the cotangent signal; a second differentiator circuit for differentiating the linearized cotangent signal; and a switching circuit responsive to the absolute value of the cosine and sine signals for selecting the output of the particular differentiator that is linear for the current shaft angle.

It is a further object of the invention to provide a synchro rate circuit that differentiates linearized representations of the tangent and cotangent of the synchro shaft angle with a failure monitoring circuit.

Each phase of the synchro is applied to a summing amplifier which generates a 400 Hz signal having an amplitude proportional to the cosine of the synchro's shaft angle. By the same token, two of the three phase outputs of the synchro are applied to a second summing amplifier that serves to generate a 400 Hz signal having an amplitude proportional to the sine of the shaft angle. For purposes of clarity, the signal representing the cosine of the shaft angle will be referred to as the Cosine signal and likewise the signal representing the sine of the shaft angle will be referred to as the Sine signal.

In the rate circuit, the Cosine signal is applied through an electronic switch to the summing junction of an integrator amplifier. A reference voltage is also applied to a negative terminal of the summing junction resulting in a signal being applied to the integrator that is equal to the difference between the reference voltage and the Cosine signal. The integrating amplifier integrates this signal over time and applies it to the positive terminal of a comparator circuit. The Cosine signal is also applied directly to the negative terminal of this comparator that serves, in turn, to actuate the electronic switch. Since the electronic switch controls the application of the Cosine signal to the integrating amplifier, the average voltage at the integrator's summing junction is maintained at an average value of zero. The Sine signal is input through a second electronic switch to a filter amplifier that serves to filter out the 400 Hz portion of the signal. Both electronic switches are controlled by the comparator. The net effect of the simultaneous switching on and off of both electronic switches is to remove equal portions from the Cosine signal, as it is applied to the summing junction of the integrator, and the Sine signal as it is applied to the filter amplifier. Removal of this portion from the Sine signal results in an output of the filter amplifier that has a value of approximately equal to the tangent of the shaft angle. Since a tangential function is only linear for the portion of the function that is close to an angular value of zero, a feedback signal is applied to the summing junction of the integrator which has the effect of linearizing the output of the filter amplifier over a greater range of shaft angles. The linearized output of the filter amplifier is then applied to a differentiator circuit which in turn produces a signal which is proportional to the rate of rotation of the synchro's shaft.

A second circuit is provided to produce a linearized Cotangent signal which is similarly differentiated to get a rate signal. The two circuits are essentially equivalent except the Sine signal is applied to the integrator in the second circuit and the Cosine signal is applied to the filter amplifier.

Due to the fact that the linearized tangent and cotangent signals reverse polarity approximately every 90°, a switching circuit is provided to select between the outputs of each of the differentiator circuits to insure that the output of the rate circuit is taken from either the Tangent or Cotangent signal with the correct polarity and in a linear state of operation. This is accomplished by comparing the absolute value of the amplitudes of the Cosine signal and the Sine signal. When for example the Cosine signal is greater than the absolute value of the Sine signal, an electronic switch selects the output from the differentiator that has differentiated the linearized Tangent signal. Similarly when the amplitude of the Sine signal is greater than the amplitude of the Cosine signal the differentiated Cotangent signal is selected.

In addition to providing a rate circuit which is particularly free of distortions from the synchro excitation voltage and other sources, the circuit lends itself to effective failure monitoring. The failure monitoring portion of the circuit makes use of the fact that normally at least one of the integrator amplifiers operates within narrow voltage output levels. Both integrator amplifiers are connected to voltage detectors and when both output levels exceed predetermined levels a validity signal is switched off.

DETAILED DESCRIPTION OF THE INVENTION

Figure 1:
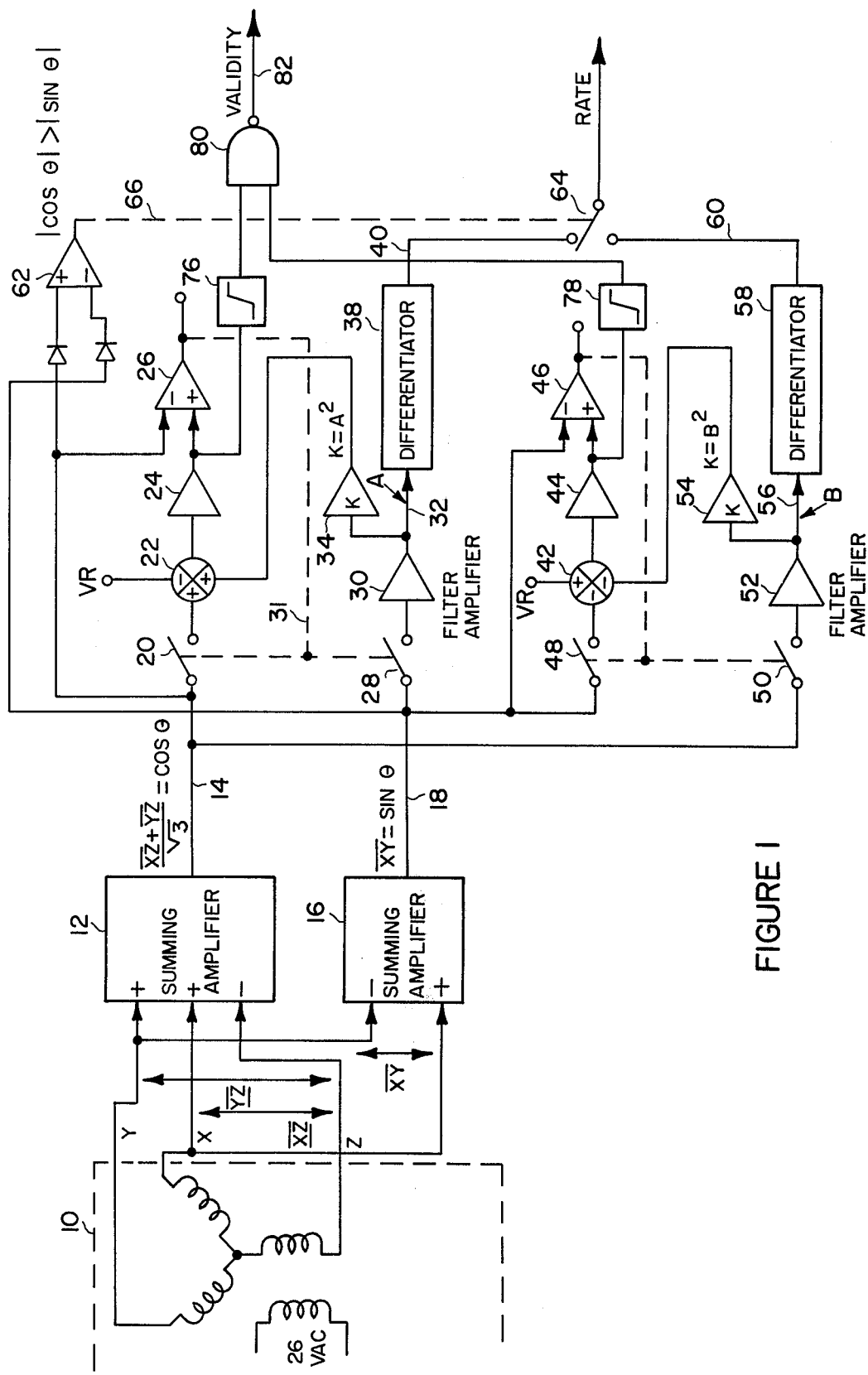
FIG. 1 is a block diagram of the synchro rate circuit.

The preferred embodiment of a rate circuit suitable for converting a synchro representation of barometric altitude into a signal representing the rate of change in barometric altitude is provided in FIG. 1. A typical three phase, X, Y, and Z, synchro having a 26 volt alternating current excitation is illustrated within the dashed line 10. Each of the three outputs of the synchro X, Y, and Z are applied to a first buffer and summing amplifier 12. Amplifier 12 combines the X, Y, and Z inputs according to the equation:

$$\frac{\overline{XZ} + \overline{YZ}}{\sqrt{3}} = \cos \theta$$

where $\theta$ is the angle of the synchro's shaft. The output of the amplifier 12 on line 14 will then be a 400 Hz signal having an amplitude equal to cosine $\theta$. Similarly, the X and Y outputs of the synchro 10 are applied to a second buffer and summing amplifier 16 that generates a 400 Hz signal on line 18 having an amplitude equal to sine $\theta$. For simplicity, the outputs of the amplifiers 12 and 16 will be referred to as the Cosine signal and the Sine signal respectively.

The Cosine signal on line 14 is applied through an electronic switch 20, typically a transistor, to the positive terminal of a summing junction 22 of an integrator circuit 24. A reference voltage $V_R$ is applied to the negative terminal of the summing junction 22. The integrating circuit 24 serves to integrate the output of the summing junction 22 over time and applies the resulting signal to the positive terminal of a comparator 26. The negative terminal of the comparator 26 receives the Cosine signal directly from line 14. A second electronic switch 28 transmits the Sine signal from line 18 to a filter amplifier 30. Both switches 20 and 28 are controlled by the output of the comparator 26 as indicated by the dashed line 31.

Figure 2:
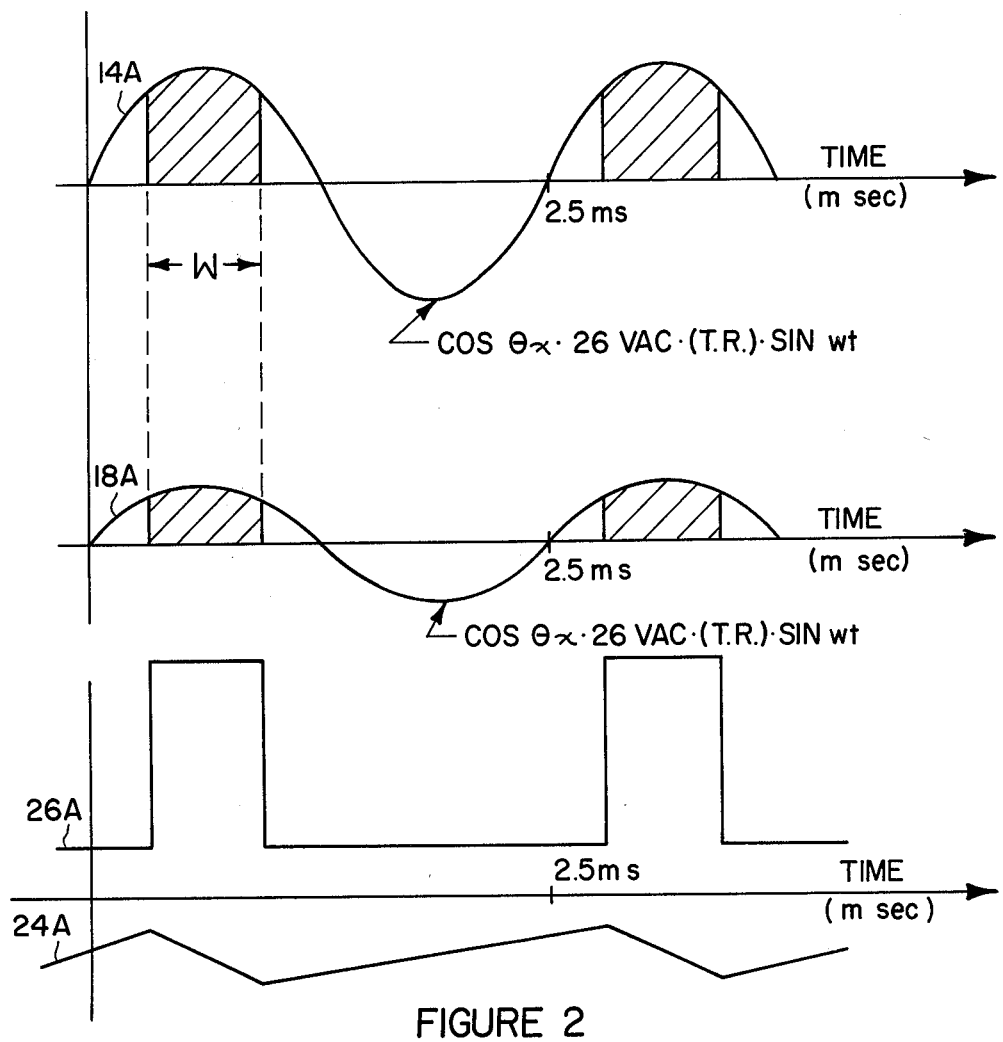
FIG. 2 is a timing chart illustrating the 400 Hz Cosine and Sine signals in conjunction with the output of an integrator and a comparator.

The operation of the comparator is illustrated by the graph in FIG. 2. In FIG. 2 the output of the integrator 24 corresponds to the waveform 24A and the operation of the comparator corresponds to the waveform 26A. When the output of the comparator 26 is positive, the switches 20 and 28 will close thereby having the effect of applying a portion W of the 400 Hz Cosine signal, represented by waveform 14A of FIG. 2, to the integrator summing junction 22, and a similar portion of the 400 Hz Sine signal represented by waveform 18A of FIG. 2 to the filter amplifier 30. The effect of applying the portion W from the Cosine signal 14A is to maintain the average voltage output by the summing junction 22 at zero. The average output of the integrator summing junction can be represented by the formula:

$$W \cdot \cos \theta \cdot 26\ VAC \cdot T_R - V_R = 0$$

where 26 $VAC$ represents the synchro excitation voltage and $T_R$ represents the synchro transformation ratio. Here the value of W can be represented as:

$$W = \frac{V_R}{\cos \theta \cdot 26\ VAC \cdot T_R}$$

Since the signal being applied to the filter amplifier 30 through the switch 28 is also an equal portion W of the Sine signal, the output A of the amplifier on line 32 may be represented mathematically as:

$$A = W \cdot \sin \theta \cdot 26\ VAC \cdot T_R$$

By substituting W from the equation above into the equation for A, the equation below results:

$$A = \frac{\sin \theta \cdot 26\ VAC \cdot T_R}{\cos \theta \cdot 26\ VAC \cdot T_R} \cdot V_R = V_R \tan \theta$$

Thus, it may be appreciated that the output A of the filter amplifier 30 on line 32 will be proportional to the reference voltage $V_R$ times the tangent of $\theta$. As a result, the output of the filter amplifier 30 is independent of both the 26 VAC excitation voltage and the synchro transformation ratio $T_R$.

Figure 3:
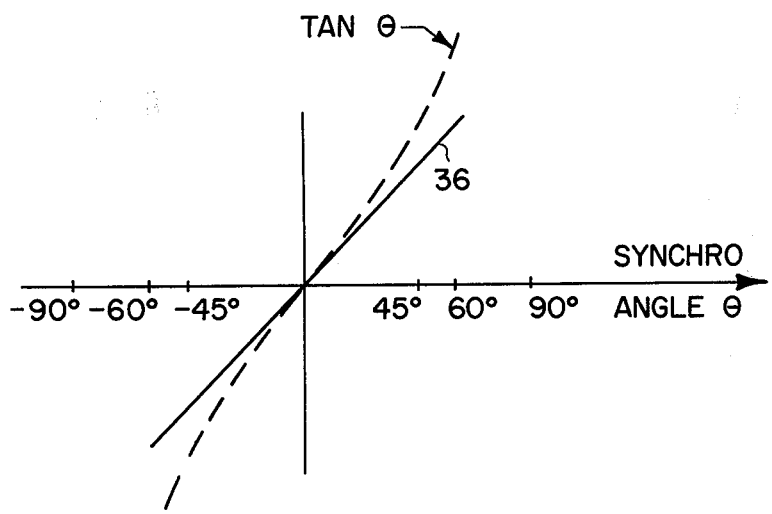
FIG. 3 is a graphical representation of the Tangent signal and a linearized Tangent signal.

Due to the fact that the tangent function, as illustrated in FIG. 3, is linear for only a relatively small portion of the synchro shaft angle $\theta$, it is desirable to linearize the output of the filter amplifier 30. This is accomplished by means of a feedback circuit which includes the function generator 34. The output A of the filter amplifier 30 on line 32 is effectively squared by the function generator 34 and is utilized as an input to a positive terminal of the summing junction 22. The feedback circuit as a result, causes the output of the filter amplifier on line 32 to approximate the linear function 36 in FIG. 3. The linearized Tangent signal on line 32 is utilized as an input to the differentiator 38. The output of a differentiator 38 on line 40 will then approximate the rate of change in barometric altitude with respect to time.

A similar circuit is utilized to generate a signal that is proportional to the cotangent of the synchro shaft angle. This circuit is illustrated in the lower portion of FIG. 1 where the Sine signal is utilized as an input to a negative terminal of the second summing junction 42. Similarly, the reference voltage $V_R$ is applied to the positive terminal of the summing junction 42 and the resulting signal is utilized as input to the second integrating circuit 44. As in the prior circuit, the Sine signal from line 18 is compared in a second comparator circuit 46 to the output of the second integrator circuit 44 and the output of the comparator circuit 46 is utilized to control the two electronic switches 48 and 50. As previously described, the action of the switches 48 and 50 will be effective to apply a portion W from the 400 Hz Sine signal to the summing junction 42 and an equal portion W of the 400 Hz Cosine signal to the second filter amplifier 52. The output B of the filter amplifier 52 is squared by the amplifier 54 and utilized as a feedback signal to the negative terminal of the summing junction 42. The resultant output of the filter amplifier 52 on line 56 is a linearized Cotangent signal similar to the linearized Tangent signal 36 as shown in FIG. 3. The linearized Cotangent signal is applied to the second differentiator 58 which produces a signal that approximates the rate of change in barometric altitude with respect to time.

Figure 4:
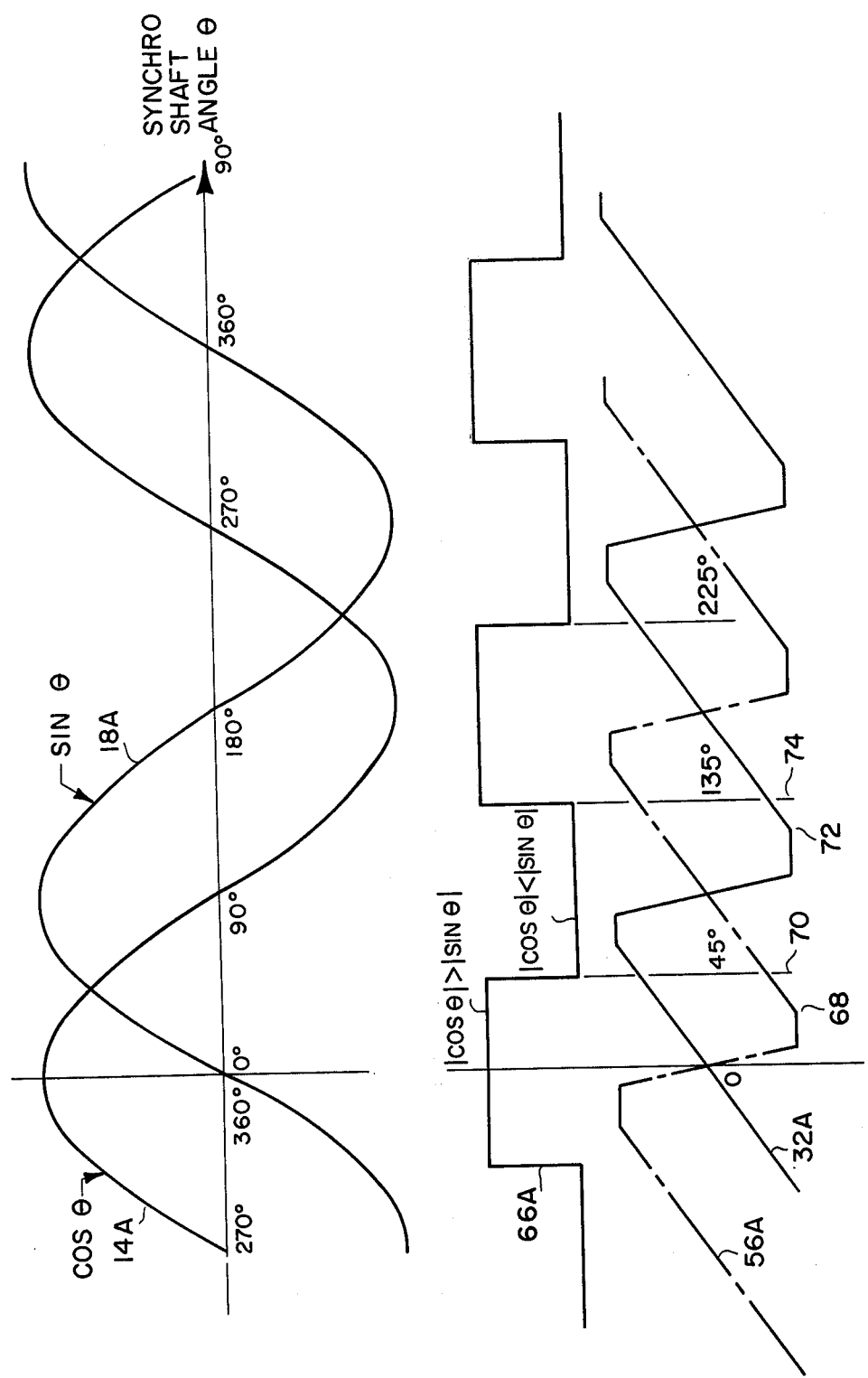
FIG. 4 is a graphical representation of the Cosine and Sine signal amplitudes; the linearized Tangent and Cotangent signals; and the switching characteristics of the differentiator switch.

Since the Tangent signal on line 32 and the Cotangent signal on line 56 reverse polarity periodically, as illustrated by the waveforms 32A and 56A in FIG. 4 that correspond to the linearized Tangent signal on line 32 and the Cotangent signal on line 56 of FIG. 1 respectively, it is desirable to select the output of the differentiator 38 or 58 that happens to be linear for the current value of θ. This is accomplished by utilizing a comparator 62 to compare the absolute value of the amplitude of the Cosine signal on line 14 with the absolute value of the amplitude of the Sine signal on line 18. When the absolute value of the Cosine signal is greater than the absolute value of the Sine signal, the comparator 62 causes the switch 64 to select as an output from the rate circuit of FIG. 1 the signal from differentiator 38 on line 40. Similarly, when the absolute value of the Sine signal is greater than the Cosine signal, the switch 64 will select the output of the second differentiator circuit 58 on line 60. The control relationship between the comparator 62 and the switch 64 is indicated by the dashed line 66 in FIG. 1. Operation of the comparator 62 is illustrated by the waveforms presented in FIG. 4 where the waveform 14A represents the amplitude of the 400 Hz Cosine signal and the waveform 18A represents the amplitude of the 400 Hz Sine signal with respect to the synchro shaft angle θ. As the synchro shaft angle θ rotates from 0° towards 180°, the output A on line 32 of the first filter amplifier 30, represented by waveform 32A in FIG. 4 is linear thus providing a desirable output for the system. Since at this point the absolute value of the Cosine signal is greater than the Sine signal, the output of the comparator 62, as represented in FIG. 4 by the waveform 66A, causes the switch 64 to select the output from the first differentiator 38. When the synchro angle θ reaches a value of approximately 25°, indicated by point 68 in FIG. 4, the output of the second filter amplifier 52 becomes linear. At this point, the output of differentiator 58 will begin to track the output of differentiator 38. When the synchro shaft angle θ reaches 45°, the comparator 62 will cause the switch 64 to switch the rate circuit output from the differentiator 38 to the differentiator 58. At this particular switching point 70 the outputs of differentiator 38 and differentiator 58 will be equal and as a result the output voltage of the rate circuit in FIG. 1 will be unaffected by the change of differentiators. As the synchro angle θ continues to increase to point 72 of FIG. 4, the output of the filter amplifier 32A will again become linear and as a result the differentiator 38 will start tracking the output of the differentiator 58. Again, when the synchro shaft angle θ is equal to 90° the comparator 62 will switch the rate circuit output from the differentiator 58 to differentiator 38. This process is continually repeated as the synchro shaft is rotated throughout 360° of rotation resulting in a smooth and linear output of the rate circuit representing the rate of angular rotation of the synchro shaft.

It will be appreciated that the invention is effective to prevent discontinuities in the rate output which typically occurs every 360° in a conventional synchro to analog converters that uses only a single differentiator.

Another significant advantage of the above described system is that the gain of the differentiators 38 and 58 can be very low due to the fact that the synchro output is divided into four segments of ± 45° with a large scale factor for each signal. This particular feature makes the rate output particularly insensitive to noise.

An additional feature of the invention is an enhanced failure monitoring capability. As indicated by the waveform 24A in FIG. 2, the average integrator output is close to zero volts. However, as soon as the output 32A of the filter amplifier 30 becomes non-linear, the integrator control loop loses regulation and the integrator 24 produces an excessive voltage. An excessive integrator output voltage is also produced if: there is a circuit failure; the synchro input signal is lost; the excitation voltage is lost; or one of the interconnecting lines is opened. During normal operation, however, at least one of the integrators 24 or 44 will be in regulation. This characteristic of the circuit is used to provide an effective monitoring scheme. A voltage detector 76 is used in conjunction with integrator 24 and a second voltage detector 78 is used in conjunction with integrator 44 to detect excessive voltage outputs. When an excessive voltage output is detected, the detectors 76 and 78 transmit a high signal to the NAND gate 80. During normal operation at least one of the integrators 24 or 44 will be in regulation resulting in a low signal on at least one of the inputs to the NAND gate 80. A low input to one or more of the inputs to the NAND gate 80 will result in the maintenance of the positive validity signal on line 82. However, if there is a circuit failure the detectors 76 and 78 will each generate high signals thus causing the NAND gate to switch off the validity signal. In this manner an effective and reliable indication of the validity of the rate circuit output is maintained.

I claim:
1. A circuit for generating a signal representing the rate of rotation of a synchro comprising:
  means for generating a cosine signal representing the cosine of the synchro shaft angle;
  means for generating a sine signal representing the sine of the synchro angle;
  means responsive to said sine signal and said cosine signal, for generating a tangent signal representing the tangent of the synchro shaft angle;
  means, responsive to said cosine and said sine signals, for generating a cotangent signal representing the cotangent of the synchro shaft angle;
  first differentiator means for differentiating said tangent signal into a first rate signal;
  second differentiator means for differentiating said cotangent signal into a second rate signal; and
  switch means, responsive to said sine and said cosine signal, for selecting one of said rate signals having substantially linear characteristics.

2. The circuit of claim 1 wherein said tangent signal generating means additionally includes a first feedback means, responsive to said sine signal, for linearizing said tangent signal.

3. The circuit of claim 2 wherein said cotangent signal generating means additionally includes feedback means, responsive to said cosine signal, for linearizing said cotangent signal.

4. The circuit of claim 3 wherein said tangent signal generating means includes:
  a first integrator means, operatively connected to said cosine signal generating means and a reference voltage, for generating a first integration signal;
a first comparator means, operatively connected to said cosine signal generating means and said first integrator means, for comparing said first integration signal to said cosine signal;
a first switch means, responsive to said first comparator means, for selectively disconnecting said first cosine signal generating means from said first integrator means;
a first filter amplifier means, operatively connected between said sine generator means and said first differentiator means, for filtering and amplifying said sine signal; and
a second switch means operatively connected to said first comparator means, for selectively disconnecting said first filter amplifier means from said sine signal generating means.

5. The circuit of claim 4 wherein said cotangent signal generating means includes:
a second integrator means, operatively connected to said sine signal generating means and said reference voltage for generating a second integration signal;
a second comparator means, operatively connected to said integrator means and said sine signal generating means, for comparing said second integration signal to said sine signal;
a third switch means, responsive to said second comparator means, for selectively disconnecting said sine generating means from said second integrator means;
a second filter amplifier means, operatively connected between said cosine signal generating means and said second differentiator means, for amplifying and filtering said cosine signal input to said second differentiator means; and
a fourth switch means, operatively connected to said second comparator means, for selectively disconnecting said second filter amplifier means from said cosine generating means.

6. The circuit of claim 5 wherein said first feedback means includes a first function generator operatively connected between said first filter amplifier means and said first integrator means for applying to said first integrator means a signal proportional to the square of said first filter means output.

7. The circuit of claim 6 wherein said second feedback means includes a second function means, operatively connected between said second filter amplifier means and said second integrator means, for applying to said second integrator means a signal proportional to the square of said second filter means output.

8. The circuit of claim 7 additionally including means for indicating the validity of said rate signals.

9. The circuit of claim 8 wherein said validity means includes a logic circuit for measuring the voltage output of said first and said second integrator means and generating a validity signal when at least one of said integrator means is within predefined operating limits.

10. A circuit for generating a signal representing the rate of rotation of a synchro comprising:
a first summing amplifier operatively connected to the three phase output of the synchro and effective to generate a signal representing the cosine of the synchro shaft angle;
a second summing amplifier operatively connected to two of the three phase outputs of the synchro and effective to generate a signal representing the sine of the synchro shaft angle;
a first integrator circuit including a first summing junction;
a first electronic switch operatively connected between said first summing amplifier and said first summing junction;
a voltage source operatively connected to said first summing junction;
a first comparator circuit, operatively connected and responsive to said first integrator circuit and said first summing amplifier, and effective to control said first electronic switch;
a second electronic switch operatively connected to said second summing amplifier and controlled by said first comparator circuit;
a first filter amplifier operatively connected to said second electronic switch and effective to generate a signal representative of the tangent of the synchro shaft angle;
a first differentiator circuit operatively connected to said first filter amplifier and effective to differentiate said tangent signal into a first rate signal;
a second integrator circuit including a second summing junction operatively connected to said voltage source;
a third electronic switch operatively connected between said second summing amplifier and said second summing junction;
a second comparator circuit operatively connected and responsive to said second integrator circuit and said second summing amplifier and effective to control said third electronic switch;
a fourth electronic switch operatively connected to said first summing junction and controlled by said second comparator circuit;
a second filter amplifier operatively connected to said fourth electronic switch and effective to generate a signal representative of the cotangent of the synchro shaft angle;
a second differentiator circuit operatively connected to said second filter amplifier and effective to differentiate said cotangent signal into a second rate signal; and
a third comparator circuit operatively connected to said first and said second summing amplifiers and effective to select one of said rate signals having linear characteristics.

11. The circuit of claim 10 additionally including:
a first feedback circuit comprising a function generator circuit, operatively connected between said first filter amplifier and said first summing junction, effective to apply to said first summing junction a signal proportional to the square of the output of said first filter amplifier; and
a second feedback circuit comprising a function generator, operatively connected between said second filter amplifier and said second summing junction, effective to apply to said second summing junction a signal proportional to the square of the output of said second filter amplifier.

12. The circuit of claim 11 additionally including:
a first voltage detector operatively connected to said first integrator circuit;
a second voltage detector operatively connected to said second integrator circuit; and a logic circuit, operatively connected to said first and said second voltage detectors, effective to generate a validity signal.

13. An electronic circuit for generating a signal representative of a rate of change in barometric altitude comprising:
a synchro where barometric altitude is represented by the angular position of the synchro shaft;
means for converting the shaft angle into signals representing the sine and cosine of the shaft angle;
means, responsive to said sine and cosine signals, for generating a signal representative to the tangent of the shaft angle;
means for differentiating said tangent signal into a first rate signal;
means, responsive to said sine and cosine signals, for generating a signal representative of the cotangent of the shaft angle;
means for differentiating said cotangent signal into a second rate signal; and
means, responsive to said sine and cosine signals for selecting said first or said second rate signal.

14. The circuit of claim 13 wherein said tangent and said cotangent generating means include feedback means for linearizing said tangent and said cotangent signals.

15. The circuit of claim 14 additionally including means, responsive to said tangent and cotangent generating means, for generating a signal indicating the validity of said rate signals.

* * * * *